United States Patent
Mishra et al.

(10) Patent No.: US 11,627,756 B2
(45) Date of Patent: *Apr. 18, 2023

(54) BREAKABLE CAPSULES AND METHODS OF FORMING THEREOF

(71) Applicant: Altria Client Services LLC, Richmond, VA (US)

(72) Inventors: Munmaya K. Mishra, Manakin Sabot, VA (US); Douglas Fernandez, Henrico, VA (US)

(73) Assignee: Altria Client Services LLC, Richmond, VA (US)

( * ) Notice: Subject to any disclaimer, the term of this patent is extended or adjusted under 35 U.S.C. 154(b) by 72 days.

This patent is subject to a terminal disclaimer.

(21) Appl. No.: 17/179,590

(22) Filed: Feb. 19, 2021

(65) Prior Publication Data

US 2021/0169131 A1    Jun. 10, 2021

Related U.S. Application Data

(60) Continuation of application No. 16/412,773, filed on May 15, 2019, now Pat. No. 10,925,310, which is a
(Continued)

(51) Int. Cl.
*A24B 15/28* (2006.01)
*A24B 13/00* (2006.01)
(Continued)

(52) U.S. Cl.
CPC ............ *A24B 15/283* (2013.01); *A24B 13/00* (2013.01); *A24D 3/061* (2013.01); *B01J 13/04* (2013.01)

(58) Field of Classification Search
CPC ...... A24B 15/283; A24B 13/00; A24D 3/061; B01J 13/04
See application file for complete search history.

(56) References Cited

U.S. PATENT DOCUMENTS

| 5,254,294 A | 10/1993 | Wunderlich et al. |
| 7,255,921 B2 | 8/2007 | Kamaguchi et al. |
| (Continued) | | |

FOREIGN PATENT DOCUMENTS

| AU | 2012207021 A1 | 8/2012 |
| CN | 1969854 A * | 5/2007 |
| (Continued) | | |

OTHER PUBLICATIONS

European Office Action dated Oct. 18, 2021 for corresponding European Application No. 17725116.2.
(Continued)

*Primary Examiner* — Anthony Calandra
(74) *Attorney, Agent, or Firm* — Harness, Dickey & Pierce, P.L.C.

(57) ABSTRACT

A breakable capsule such as a seamless breakable capsule useful in a smoking article or a smokeless tobacco product includes an outer shell formed of a cross-linked agar matrix including at least one filler, and an inner core surrounded by the outer shell which comprises a liquid or gel based composition of a flavorant and/or non-flavorant. The cross-linked agar matrix is reinforced with carboxymethyl cellulose that is dispersed throughout the agar matrix so as to fill empty spaces in the agar matrix and inhibit the composition from passing through the empty spaces of the agar matrix.

20 Claims, 5 Drawing Sheets

Related U.S. Application Data division of application No. 15/184,631, filed on Jun. 16, 2016, now Pat. No. 10,334,873.

(51) Int. Cl.
*A24D 3/06* (2006.01)
*B01J 13/04* (2006.01)

(56) References Cited

U.S. PATENT DOCUMENTS

| | | |
|---|---|---|
| 7,490,436 B2 | 2/2009 | Kohno et al. |
| 7,744,922 B2 | 6/2010 | Mane et al. |
| 7,754,239 B2 | 7/2010 | Mane et al. |
| 7,972,620 B2 | 7/2011 | Andersen et al. |
| 8,070,466 B2 | 12/2011 | Takei et al. |
| 8,470,215 B2 | 6/2013 | Zhang |
| 8,506,273 B2 | 8/2013 | Ikeda et al. |
| 8,617,628 B2 | 12/2013 | Siegel et al. |
| 8,671,951 B2 | 3/2014 | Ercelebi et al. |
| 8,820,331 B2 | 9/2014 | Hartmann et al. |
| 8,992,196 B2 | 3/2015 | Ikeda et al. |
| 2002/0090697 A1 | 7/2002 | Hince |
| 2002/0187190 A1 | 12/2002 | Cade et al. |
| 2004/0072724 A1 | 4/2004 | Nakamura |
| 2005/0008702 A1 | 1/2005 | Faour et al. |
| 2006/0144412 A1 | 7/2006 | Mishra et al. |
| 2006/0174901 A1 | 8/2006 | Karles et al. |
| 2008/0029110 A1 | 2/2008 | Dube et al. |
| 2008/0139521 A1 | 6/2008 | Anker |
| 2008/0286408 A1 | 11/2008 | Karles et al. |
| 2009/0004229 A1 | 1/2009 | Pastini et al. |
| 2009/0038628 A1 | 2/2009 | Shen et al. |
| 2009/0050163 A1 | 2/2009 | Hartmann et al. |
| 2009/0208568 A1 | 8/2009 | Hannetel et al. |
| 2011/0083678 A1 | 4/2011 | Duan et al. |
| 2011/0104218 A1 | 5/2011 | Karles et al. |
| 2011/0232658 A1 | 9/2011 | Dube et al. |
| 2011/0271968 A1 | 11/2011 | Carpenter et al. |
| 2012/0024305 A1 | 2/2012 | Liu et al. |
| 2012/0045553 A1 | 2/2012 | Sengupta et al. |
| 2012/0298123 A1 | 11/2012 | Woodcock et al. |
| 2013/0217609 A1 | 8/2013 | Fernandes et al. |
| 2013/0340776 A1 | 12/2013 | Mishra et al. |
| 2014/0053855 A1 | 2/2014 | Hartmann et al. |
| 2014/0137878 A1 | 5/2014 | Karles et al. |
| 2014/0196729 A1 | 7/2014 | Ercelebi et al. |
| 2014/0234411 A1 | 8/2014 | Kamaguchi et al. |
| 2016/0021927 A1 | 1/2016 | Kondo |

FOREIGN PATENT DOCUMENTS

| | | | | |
|---|---|---|---|---|
| CN | 107362154 A | * | 11/2017 | ............ A23J 3/00 |
| EP | 0513603 A1 | | 11/1992 | |
| EP | 2180795 B1 | * | 2/2012 | ............ A23L 2/52 |
| JP | 2002-076103 A | | 3/2002 | |
| WO | WO-2013020833 A2 | | 2/2013 | |
| WO | WO-2015128028 A1 | | 9/2015 | |

OTHER PUBLICATIONS

Brandau, "Highly Efficient Encapsulation Processes for Wide Range Industrial Applications From Food to Pharmaceutics to Consumer Products",https://www.brace.de/en/probiotics-encapsulation/articles/probiotics-enca- psulation.html; BRACE GmbH, 3 pages, printed Mar. 3, 2017.

International Search Report and Written Opinion dated Jul. 18, 2017 in corresponding International Patent Application No. PCT/US2017/032462, 13 pages.

* cited by examiner

BREAKABLE CAPSULES AND METHODS OF FORMING THEREOF

CROSS REFERENCE TO RELATED APPLICATIONS

This application is a continuation patent application of U.S. patent application Ser. No. 16/412,773, filed May 15, 2019, which is a divisional patent application of U.S. patent application Ser. No. 15/184,631, filed Jun. 16, 2016, the entire contents of each of which are incorporated herein by reference.

TECHNICAL FIELD

This disclosure relates to breakable capsules and methods of producing the same. The breakable capsules can be included in combustible or noncombustible tobacco products.

BACKGROUND

The taste of mainstream smoke from smoking articles containing tobacco can be enhanced by incorporating various flavor-enhancing agents ("flavorants") as additives into the smoking articles. For instance, tobacco smoke passing through a carbon sorbent material can lose favorable taste attributes. Thus, adding various flavorants back into tobacco smoke to replace lost flavorants is desirable. However, the enhancement in the taste of smoking articles by known methods is not long-lasting and may result in products having inconsistent flavor. Volatile flavors incorporated into smoking products are not stably retained. Flavorants may inadvertently migrate into sorbents of cigarette filters capable of removing gas-phase constituents. Further flavorants superficially applied to either the tobacco-containing portion or the packaging portion of cigarette products may be irreversibly lost.

SUMMARY

Disclosed herein is a breakable capsule such as a seamless breakable capsule useful in a smoking article or a smokeless tobacco product. The breakable capsule includes an outer shell formed of a cross-linked agar matrix including at least one filler. An inner core of the breakable capsule is surrounded by the outer shell and comprises a liquid or gel based composition of a flavorant and/or non-flavorant. The cross-linked agar matrix is reinforced with carboxymethyl cellulose that is dispersed throughout the agar matrix so as to fill empty spaces in the agar matrix and inhibit the composition from passing through the empty spaces of the agar matrix.

Also disclosed herein is a method of forming a seamless breakable capsule using a co-extrusion process performed by a coaxial multiple nozzle system. The seamless breakable capsule includes an outer shell formed of a cross-linked agar matrix including at least one filler. The cross-linked agar matrix is reinforced with carboxymethyl cellulose that is dispersed throughout the agar matrix such that the carboxymethyl cellulose fills empty spaces in the agar matrix and inhibits a liquid or gel composition contained in an inner core of the seamless breakable capsule from passing through the empty spaces of the agar matrix. The method includes supplying a shell forming solution including agar, at least one filler, carboxymethyl cellulose, and purified water to an outer nozzle of a coaxial multiple nozzle system. A liquid or gel composition of a flavorant or non-flavorant is simultaneously supplied to an inner nozzle of the coaxial multiple nozzle system.

The shell forming solution and the composition are simultaneously delivered from respective outer and inner nozzles of the multiple nozzle system while the nozzles are vibrated such that the vibration causes droplets of the composition to form as the composition exits the inner nozzle. The shell forming solution surrounds each droplet of the composition and forms a wet capsule. The wet capsules are dried so as to form respective seamless breakable capsules that include an outer shell formed of a cross-linked agar matrix that includes at least one filler and an inner core surrounded by the outer shell that includes the composition. The shell forming solution includes an effective amount of carboxymethyl cellulose such that the carboxymethyl cellulose is dispersed throughout empty spaces in the cross-linked agar matrix when the shell forming solution is dried and the carboxymethyl cellulose fills a sufficient amount of the empty spaces in the agar matrix to inhibit the composition from passing through the empty spaces of the agar matrix.

Further disclosed herein is a breakable capsule such as a seamless breakable capsule useful in a smoking article or a smokeless tobacco product. The breakable capsule preferably consists essentially of an outer shell formed of a cross-linked agar matrix including at least one filler, and an inner core which comprises a liquid or gel based composition of a flavorant and/or non-flavorant. The cross-linked agar matrix is reinforced with carboxymethyl cellulose that is dispersed throughout the agar matrix so as to fill empty spaces in the agar matrix and inhibit the composition from passing through the empty spaces of the agar matrix.

DETAILED DESCRIPTION

Disclosed herein are embodiments of breakable capsules such as seamless breakable capsules and methods of forming seamless breakable capsules. In an embodiment, a breakable capsule such as a seamless breakable capsule can include an outer shell and an inner core that contains a composition (also referred to herein as "core content"), such as a liquid or gel composition, that may be released from the breakable capsule when the outer shell thereof is broken or ruptured. Preferably the capsules are spherical or substantially spherical. At least one breakable capsule can be incorporated in a smoking article that includes a tobacco rod and a filter element connected to the tobacco rod. Preferably, the at least one breakable capsule is included in the filter element of the smoking article.

Before or during combustion of a smoking article including the at least one breakable capsule, an adult individual can break (i.e., rupture) the outer shell thereof so as to release the composition of the inner core to a region of the smoking article through which mainstream smoke travels during a puff on a lit smoking article. In this manner, the composition released from the ruptured capsule may be used to alter the flavor, physical properties, and/or chemical properties of the mainstream smoke that travels through the region to which the composition is released before being inhaled by an adult individual. In an alternate embodiment, at least one breakable capsule can be included in a smokeless tobacco product such as chewing tobacco, moist smokeless tobacco, snus, or dry snuff such that the composition of the inner core of the breakable capsule can be released during use of the smokeless tobacco product to alter an adult individual's perception of the smokeless tobacco product.

Figure 1:
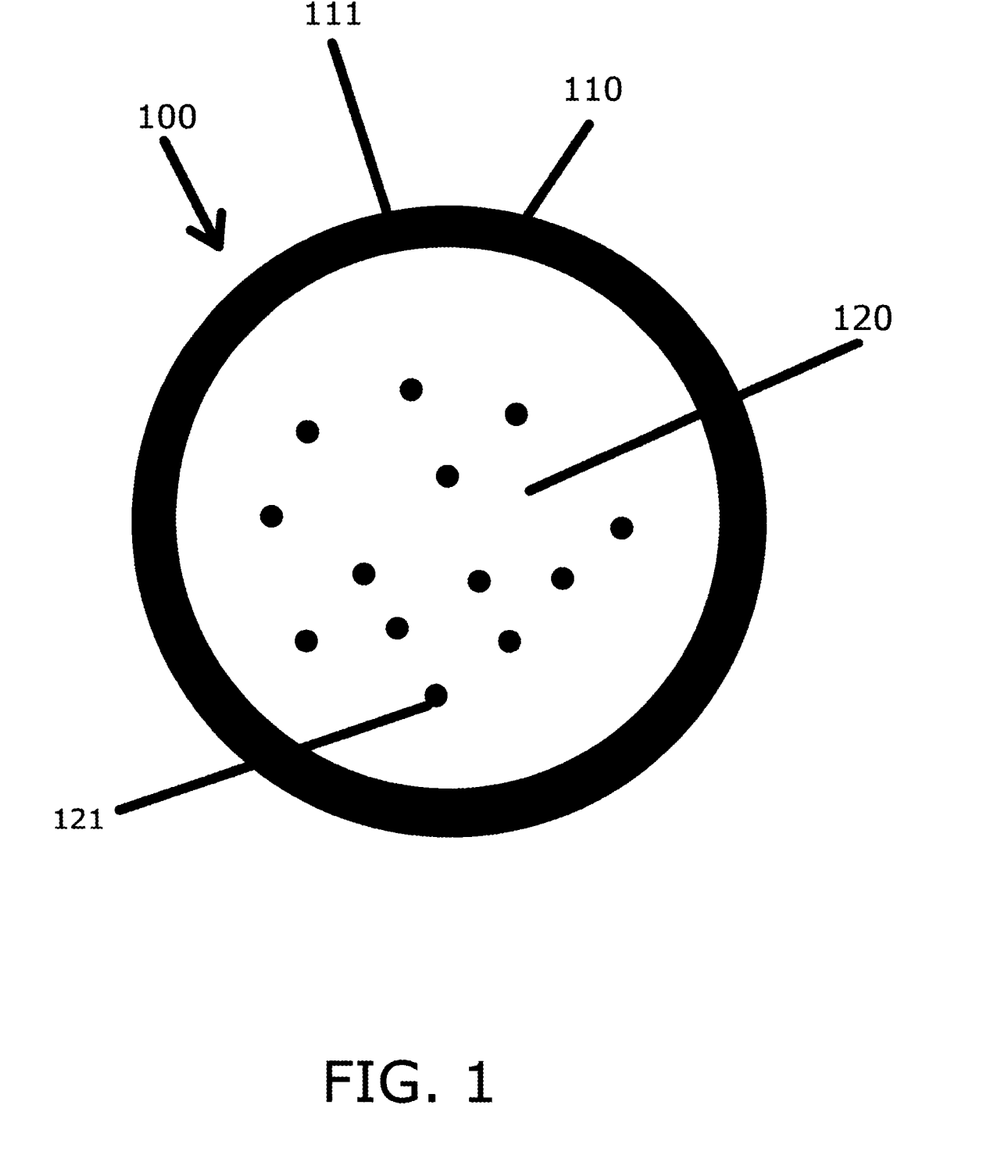
FIG. 1 illustrates a breakable capsule formed according to an embodiment as disclosed herein.

FIG. 1 illustrates an embodiment of a breakable capsule such as a seamless breakable capsule 100 formed according to a method as disclosed herein. The breakable capsule 100 can include an outer shell 110 and an inner core 120 that includes a composition of one or more flavor-enhancing agents ("flavorant") and/or one or more agents that exhibit desired chemical or physical properties ("non-flavorant"). The composition of the inner core 120 can be a liquid or gel, and can contain optional solid particles or granules 121, such as crystalized menthol. The outer shell 110 is formed of a cross-linked agar matrix that includes at least one filler. Preferably, the at least one filler is locust bean gum. The cross-linked agar matrix is reinforced with carboxymethyl cellulose (CMC) that is dispersed throughout the agar matrix. The carboxymethyl cellulose fills empty spaces in the agar matrix, which provides a barrier that inhibits the composition of the inner core 120 from passing through the empty spaces of the agar matrix, and thereby a breakable capsule 100 which is not prone to leaking may be formed.

The carboxymethyl cellulose can form a continuous or discontinuous phase of material and is preferably included in the outer shell 110 so as to fill a sufficient amount of empty spaces in the agar matrix such that the inner composition is prevented from passing through the reinforced agar matrix. Preferably, the carboxymethyl cellulose fills at least about 90% of the empty spaces of the cross-linked agar matrix. More preferably, the carboxymethyl cellulose fills at least about 99% of the empty spaces of the cross-linked agar matrix. Most preferably, the carboxymethyl cellulose forms a continuous phase of material that completely fills the empty spaces of the cross-linked agar matrix. Accordingly, the composition of the inner core 120 can be prevented from leaking from the outer shell 110 unless sufficient pressure is applied to the outer shell 110. Thus, an adult individual may apply pressure to the seamless breakable capsule 100 before or during use of a tobacco product including the at least one seamless breakable capsule 100 such that the outer shell 110 thereof ruptures and releases the composition of the inner core 120. Because the carboxymethyl cellulose is water soluble, the outer shell 110 can also include an optional outer coating 111 on an outer surface thereof, such as a coating of ethyl cellulose, which seals the capsule from outside humidity.

The composition of the inner core 120 including the one or more flavorants and/or one or more non-flavorants is selected to provide desired flavor and/or physical/chemical properties to mainstream smoke inhaled by an adult individual during a puff on a smoking article including the at least one seamless breakable capsule 100. Alternatively, if the at least one seamless breakable capsule 100 is included in a smokeless tobacco product, the flavorants and/or non-flavorants are selected to provide desired flavor and/or physical/chemical properties to the smokeless tobacco product used by an adult individual.

Examples of flavorants that can be used to form, or included in, the composition of the inner core 120 of the seamless breakable capsule 100 can include, without limitation, licorice, wintergreen, cherry and berry type flavorants, Dramboui, bourbon, scotch, whiskey, spearmint, peppermint, lavender, cinnamon, cardamon, *apium* graveolents, clove, cascarilla, nutmeg, sandalwood, bergamot, geranium, honey essence, rose oil, vanilla, lemon oil, orange oil, Japanese mint, *cassia*, caraway, cognac, jasmine, chamomile, menthol, ilangilang, sage, fennel, piment, ginger, anise, coriander, coffee, salts, sweeteners, carbohydrates, mint oils from a species of the genus mentha, eugenol, cocoa, citrus or other fruit flavors and combinations thereof. Examples of non-flavorants that can be included in the inner core 120 of the seamless breakable capsule 100 can include, without limitation, sensates such as cooling agents, diluents, aerosol formers, and/or other equivalents. Preferably, a diluent such as medium-chain triglyceride (MCT) oil is used in the composition. MCT oil is stable and has a neutral flavor.

The outer shell 110 of the breakable capsule 100 is preferably formed from a shell forming solution during a co-extrusion process in which the outer shell 110 is formed around the composition that makes up the inner core 120. The shell forming solution that forms the outer shell 110 includes agar as a gelling agent, in combination with carboxymethyl cellulose (CMC), one or more fillers, purified water, and/or other ingredients. For example, the one or more fillers can include locust bean gum, konjac, and/or xanthan gum. Fillers can also include a low viscosity polymer such as polymaltotriose (pullulan). Alternatively, or in addition to pullulan, the filler can include cellulose derivatives such as hydroxypropyl methyl cellulose (HPMC), hydroxypropyl cellulose (HPC), soluble cellulose gum, methyl cellulose, and/or a starch derivative such as dextrin or maltodextrin. The shell forming solution can also include glycerin, sorbitol, sodium chloride, guar gum, gum arabic, and/or inulin.

The shell forming solution includes carboxymethyl cellulose (CMC). Carboxymethyl cellulose acts as a binder in the shell forming solution and also acts to increase the viscosity of the shell forming solution. However, an increase in the concentration of carboxymethyl cellulose in the shell forming solution disproportionately increases the viscosity of the solution. Without wishing to be bound by theory, the carboxymethyl cellulose in the shell forming solution forms a continuous or discontinuous phase through hydrogen bonding of its free hydroxyl groups. When dried, the carboxymethyl cellulose can reinforce the cross-linked agar matrix of the outer shell 110 by filling in empty spaces or pores thereof. In an embodiment, the carboxymethyl cellulose can be cross-linked with the agar-matrix. The carboxymethyl cellulose is included in the shell forming solution used to form an outer shell 110 of a seamless breakable capsule 100 in an amount effective to inhibit the composition of the inner core from passing through the agar matrix such that the composition does not leak from the seamless breakable capsule 100. In this manner, the porosity of the outer shell 110 can be reduced such that the outer shell 110 does not require an outer coating to be applied thereto to seal the outer shell 110 and prevent the composition from leaking therefrom, and the cost of manufacturing the seamless breakable capsules can be reduced. In an embodiment, the shell forming solution can also include one or more carbohydrates such as an alginate or pectin, which can be cross-linked with the agar matrix.

The breakable capsules 100 according to embodiments as disclosed herein have a crush strength such that the outer shell 110 will not rupture unless a sufficient force is applied to the outer shell 110. Preferably, the breakable capsules 100 have a crush strength of about 3 to about 10 Newtons. The breakable capsules 100 are preferably seamless and spherical or substantially spherical in shape, and preferably each breakable capsule 100 formed according to an embodiment disclosed herein has an approximately constant diameter. In an embodiment, the seamless breakable capsules 100 have an outer diameter of about 2 to 4.5 mm, such as a diameter of about 2.5 to 4.5 mm, and more preferably an outer diameter of 3.5 to 4.5 mm.

Figure 2:
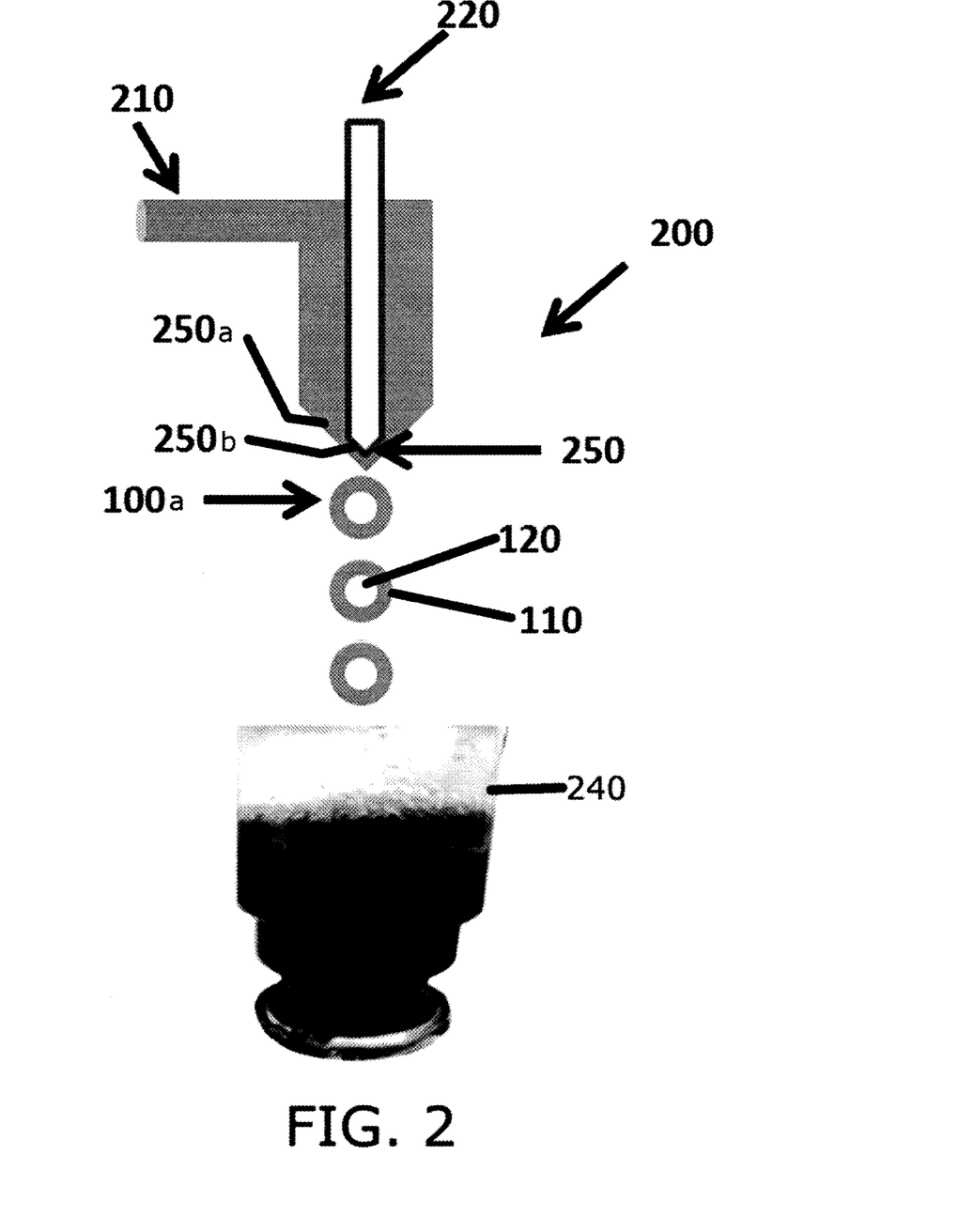
FIG. 2 illustrates a co-extrusion process performed by a coaxial multiple nozzle system that is operable to form seamless breakable capsules according to embodiments as disclosed herein.

FIG. 2 illustrates a co-extrusion process performed by a coaxial multiple nozzle system 200 that is operable to form seamless breakable capsules 100 according to embodiments as disclosed herein. The co-extrusion multiple nozzle system 200 includes a shell forming solution feed device 210, a composition feed device 220, a cold oil bath 240, and co-axial nozzles 250 that preferably vibrate during the formation of a seamless breakable capsule 100. The shell forming solution feed device 210 is operable to feed a shell forming solution through an outer nozzle 250a of the coaxial nozzles 250, wherein the shell forming solution forms an outer shell 110 of a wet capsule 100a. The composition feed device 220 is operable to feed the composition of flavorant and/or non-flavorant through an inner nozzle 250b of the coaxial nozzles 250, wherein the composition forms the inner core 120 or core contents of the wet capsule 100a, which is surrounded by the outer shell 110. The composition preferably also includes a stable compound such as MCT oil.

Figure 3:
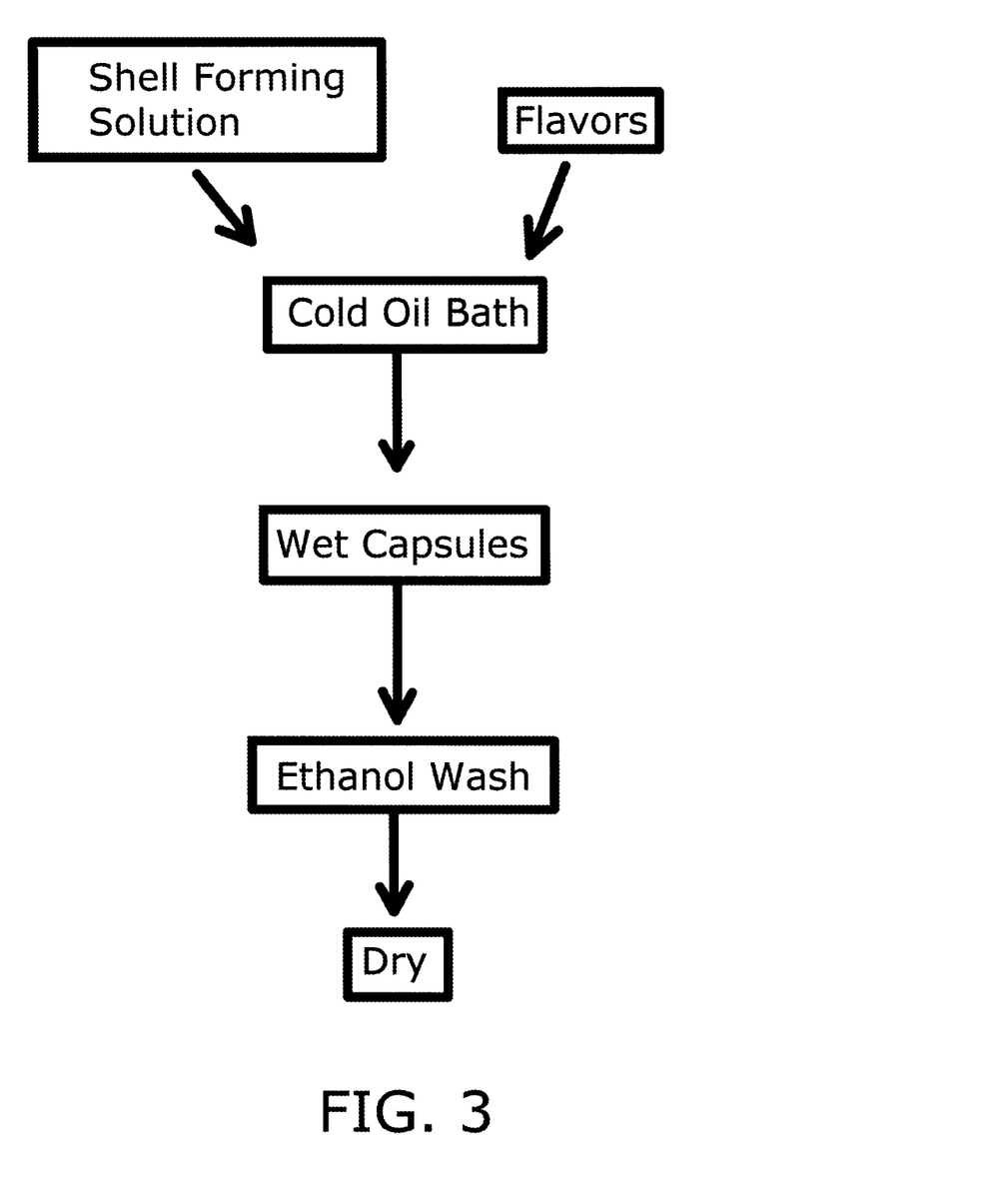
FIG. 3 is a flow chart of a method of forming seamless breakable capsules according to embodiments as disclosed herein.

FIG. 3 is a flow chart of a method of forming seamless breakable capsules according to embodiments as disclosed herein. To illustrate an embodiment of forming a seamless breakable capsule 100, reference is now made to FIGS. 2 and 3. During formation of a seamless breakable capsule 100, the composition is fed by the composition feed device 220 such that the composition exits the inner nozzle 250b of the coaxial nozzles 250. Preferably, the composition is fed at ambient temperature. The vibration of the coaxial nozzles 250 causes the composition to form into droplets that are preferably uniform wherein individual droplets form into spheres due to the surface tension of the composition.

Concurrently, the shell forming solution is fed by the shell forming solution feed device 210 such that the shell forming solution exits the outer nozzle 250a of the coaxial nozzles 250. As the shell forming solution exits the outer nozzle 250a, the shell forming solution surrounds each droplet of composition to form a wet capsule 100a. Preferably, the shell forming solution is fed at a temperature of about 50-65° C. During formation, the shell forming solution preferably has a viscosity of less than about 380 cP at a temperature of about 60° C. If the shell forming solution is too viscous, it becomes challenging to perform the forming process, which may result in low quality capsules being formed, and/or result in a low yield of capsules. Further, if the shell forming solution is too viscous, the outer nozzle 250a can become clogged such that the shell forming solution cannot exit the outer nozzle 250a, or does not evenly exit the outer nozzle 250a.

An increase in the percentage of agar and/or carboxymethyl cellulose in the shell forming solution causes the viscosity of the shell forming solution to likewise increase. Therefore, the ratio between the amount of agar and carboxymethyl cellulose used in the shell forming solution is selected such that the shell forming solution does not include too much of either agar or carboxymethyl cellulose which would result in the shell forming solution becoming too viscous. Furthermore, the ratio of additional constituents such as fillers can be controlled so as not to form a shell forming solution that is too viscous. A shell forming solution having a suitable viscosity according to an embodiment disclosed herein can include about 1 to 2% agar, about 0.05 to 0.5% carboxymethyl cellulose, about 0.05 to 0.5% locust bean gum, and about 3.2 to 7% of additional fillers, wherein the remainder of the shell forming solution is purified water. For example, a shell forming solution including about 2% agar, about 0.5% locust bean gum, about 0.5% carboxymethyl cellulose, and purified water can form a suitably viscous solution. However, a slight increase in the amount of agar or carboxymethyl cellulose can result in a large increase in viscosity such that the shell forming solution will have an unsuitable viscosity.

For example, a shell forming solution having a suitable viscosity of 363 cP at about 60° C. is formed when the shell forming solution includes 2.0% agar, 0.5% locust bean gum, 0.5% carboxymethyl cellulose, and purified water. However, a shell forming solution having an unsuitable viscosity of 588 cP at about 60° C. is formed when the shell forming solution includes 2.3% agar, 0.5% locust bean gum, 0.5% carboxymethyl cellulose, and purified water. Therefore, the shell forming solution according to embodiments disclosed herein preferably has less than about 2% agar such that an effective amount of carboxymethyl cellulose can be included in the shell forming solution without the solution becoming too viscous, and such that the carboxymethyl cellulose can fill empty spaces of a cross-linked agar matrix of an outer shell of a capsule to inhibit the composition from passing through empty spaces of the agar matrix when the shell forming solution is dried.

On the other hand, if the shell forming solution does not include a sufficient amount of either the agar or carboxymethyl cellulose, the structural integrity of a formed capsule will be compromised, and it will be difficult to form seamless breakable capsules that have a desired diameter, such as a diameter greater than about 2 mm.

Referring back to FIGS. 2 and 3, each wet capsule 100a formed by the co-extrusion apparatus 200 is subsequently delivered into a cold oil bath 240 wherein the wet capsules 100a accumulate. The cold oil bath 240 is preferably maintained at a temperature of about 10° C. Preferably, as a wet capsule 100a is delivered (i.e. falls) into the cold oil bath 240, the shell forming solution solidifies to form the outer shell 110 of a seamless breakable capsule 100.

After a predetermined amount of wet capsules 100a accumulate in the cold oil bath 240, the wet capsules 100a are removed from the cold oil bath 240 and washed with ethanol. The ethanol wash removes any residual oil and/or water from the outer shell 110 of the wet capsules 100a. Preferably, the ethanol wash is a cold ethanol wash. After the wet capsules 100a are washed, the wet capsules 100a are filtered and then sprinkled with a separating agent. The separating agent may be a microcrystalline cellulose powder or other cellulose powder. The wet capsules 100a are then dried to form seamless breakable capsules 100 wherein the outer shells 110 of the capsules are formed of a cross-linked agar matrix that is reinforced with carboxymethyl cellulose dispersed throughout empty spaces of the agar matrix such that the composition of the inner core is unable to pass through the respective outer shells. For example, the wet capsules 100a may be slowly dried in a rotary dryer.

Preferably, the rotary dryer is maintained at a temperature of about 40° C. During the drying process, seamless breakable capsules 100 can be coated with an optional coating of ethyl cellulose if desired. Preferably the outer coating solution contains about 2% ethyl cellulose in ethanol. The outer coating of ethyl cellulose provides a water seal on the outer surface of the capsules 100 so as to prevent the outer shell 110 of a capsule from absorbing water from the atmosphere, or neighboring capsules from sticking together.

The drying process substantially removes all of the water content from the respective outer shells 110 of the seamless breakable capsules 100. As the water content is removed from an outer shell 110, the carboxymethyl cellulose (CMC) included in the outer shell 110 tends to form a water soluble continuous or discontinuous phase throughout the cross-linked agar matrix of the outer shell 110 that fills empty spaces in the matrix and reduces the overall porosity of the outer shell 110. Thus, the CMC can provide a barrier that prevents the composition contained in the inner core 120, which is preferably not a water based composition, from leaking or diffusing through the empty spaces of the cross-linked agar matrix of the outer shell 110.

Preferably, the water content of an outer shell 110 of a seamless breakable capsule 100 after drying is less than about 0.1%. However, because the outer shell 110 is formed of a bio-polymer material, the outer shell 110 will absorb water from the air when exposed to atmospheric conditions thereby causing the water content of the outer shell 110 to reach an equilibrium state with the surrounding atmosphere. Depending on the atmospheric conditions, the outer shell 110 can reach a water content of up to about 10%, which may cause the outer shell 110 to become sticky. Therefore, in some cases, it may be desirable to form the outer coating of ethyl cellulose, or other polymer material, on the outer surface of the outer shell 110 in order to keep the respective outer shells 110 of the seamless breakable capsules 100 dry and to reduce the stickiness thereof. Preferably, an outer coating of ethyl cellulose can prevent the outer shell 110 from reaching a water content greater than about 1%.

Figure 4:
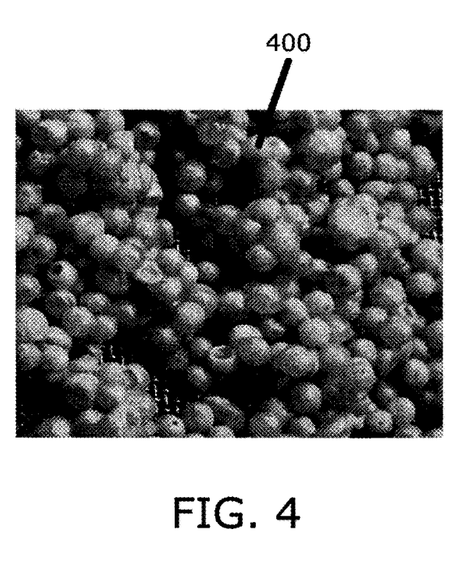
FIG. 4 shows a plurality of undesirable breakable capsules.

FIG. 4 shows a plurality of undesirable breakable capsules 400 which were formed using a shell forming solution including agar, fillers, and purified water. As shown in FIG. 4, the capsules 400 do not have uniform diameters and are leaky. The shell forming solution used to form the undesirable breakable capsules 400 did not include locust bean gum or carboxymethyl cellulose.

Figure 5:
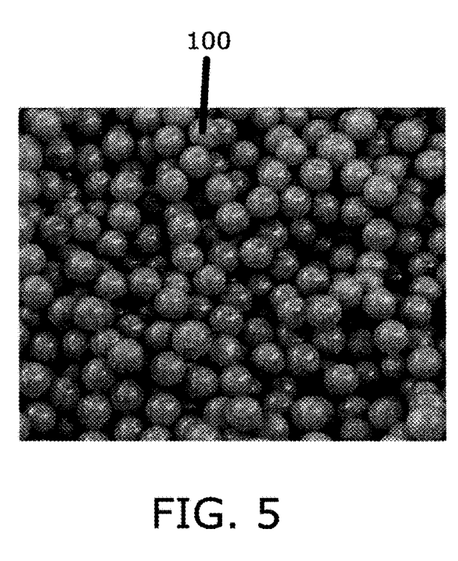
FIG. 5 shows a plurality of seamless breakable capsules formed according to an embodiment as disclosed herein.

FIG. 5 shows a plurality of seamless breakable capsules 100 formed according to an embodiment as disclosed herein. The seamless breakable capsules 100 were formed using a shell forming solution including agar, locust bean gum, carboxymethyl cellulose, fillers, and purified water in accordance with the embodiments disclosed herein. The seamless breakable capsules 100 do not leak unless sufficient pressure is applied to a respective outer shell thereof so as to rupture a respective seamless breakable capsule 100. The seamless breakable capsules 100 as shown in FIG. 5 do not require an outer coating to reduce leakiness.

In a preferred embodiment, the shell forming solution that forms the outer shell 110 when dried includes about 1 to 2% agar, about 0.05 to 0.5% locust bean gum, about 0.05 to 0.5% carboxymethyl cellulose, about 3.2 to 7% fillers, and about 90 to 95.7% purified water. In an embodiment, the fillers can include about 3-5% pullulan, about 0.1 to 1% glycerin or sorbitol, or a combination of 0.1 to 1% glycerin and sorbitol, and about 0.1-1.0% sodium chloride. In an embodiment, the fillers can include about 4-4.5% pullulan, about 1% glycerin, and about 1% sodium chloride. In an embodiment, the pullulan can be replaced with a cellulose derivative such as hydroxypropyl methylcellulose (HPMC) or hydroxypropyl cellulose (HPC), soluble cellulose gum, methyl cellulose, starch derivative such as dextrin, maltodextrin, and/or low viscosity gums such as guar gum, gum Arabic, Inulin or other suitable materials. In an embodiment, the shell forming solution can also include one or more carbohydrates such as an alginate or pectin, which can also be cross linked in the outer shell 110. The shell solution may also include one or more plasticizers such as glycerin and/or sorbitol to increase the flexibility of the outer shell 110.

Table 1 below shows various combinations of agar, locust bean gum (LBG), and carboxymethyl cellulose (CMC), which can be used to make a shell forming solution that has a suitable viscosity and which forms acceptable ("good") capsules, which can have a diameter greater than about 2 mm, such as a diameter between 2.5 and 4.5 mm, when combined with optional fillers (in addition to LBG) and water, such as those illustrated in FIG. 5. Table 1 also shows various combinations of agar, locust bean gum (LBG), and carboxymethyl cellulose (CMC) that when used make a shell forming solution that forms unacceptable ("undesirable") capsules, at diameters greater than about 2 mm, when combined with optional fillers (in addition to LBG) and water, such as those illustrated in FIG. 4. According to a preferred embodiment, the shell in a dried state can include about 10 to about 40% agar, about 0.5 to about 15% CMC, about 0.5 to about 15% locust bean gum, and about 50 to about 90% fillers selected from about 35 to about 80% pullulan, about 1 to about 20% glycerin and about 1 to about 20% sodium chloride.

TABLE 1

| Example | Agar % | LBG % | CMC % | Pullulan % | Glycerin % | Sodium Chloride % | Comment |
| --- | --- | --- | --- | --- | --- | --- | --- |
| 1 | 1 | 0.05 | 0 | 4.0-4.5 | 1 | 1 | Undesirable capsules |
| 2 | 1.5 | 0.2-0.5 | 0 | 4.0-4.5 | 1 | 1 | Undesirable capsules |
| 3 | 1.3 | 0.2 | 0 | 4.5 | 1 | 1 | Undesirable capsules |
| 4 | 1.2 | 0.3 | 0 | 4.0-4.5 | 1 | 1 | Undesirable capsules |
| 5 | 1.4 | 0.6 | 0 | 4.0-4.5 | 1 | 1 | Undesirable capsules |
| 6 | 1.5 | 0 | 0 | 4.0-4.5 | 1 | 1 | Undesirable capsules |
| 7 | 2 | 0 | 0 | 4.0-4.5 | 1 | 1 | Undesirable capsules |
| 8 | 1 | 0.05 | 0.05 | 0 | 0 | 0 | Good capsules (at a diameter of about 2 |
| 9 | 1.5 | 0.2 | 0.2 | 4.5 | 1 | 1 | Good capsules |
| 10 | 1.3 | 0.2 | 0.1 | 4.5 | 1 | 1 | Good capsules |
| 11 | 1.7 | 0.3 | 0.2 | 4 | 1 | 1 | Good capsules |
| 12 | 1.5 | 0.2 | 0.1 | 4.1 | 1 | 1 | Good capsules |
| 13 | 2 | 0.2 | 0.05 | 4.1 | 1 | 1 | Good capsules |

TABLE 1-continued

| Example | Agar % | LBG % | CMC % | Pullulan % | Glycerin % | Sodium Chloride % | Comment |
|---|---|---|---|---|---|---|---|
| 14 | 2 | 0.2 | 0.05 | 4.1 | 1 | 1 | Good capsules |
| 15 | 2 | 0.25 | 0.1 | 4.5 | 1 | 1 | Good capsules |
| 16 | 1.7 | 0.2 | 0.1 | 4.5 | 1 | 1 | Good capsules |
| 17 | 2 | 0.5 | 0.5 | 4.0-4.5 | 1 | 1 | Good capsules |

Figure 6:
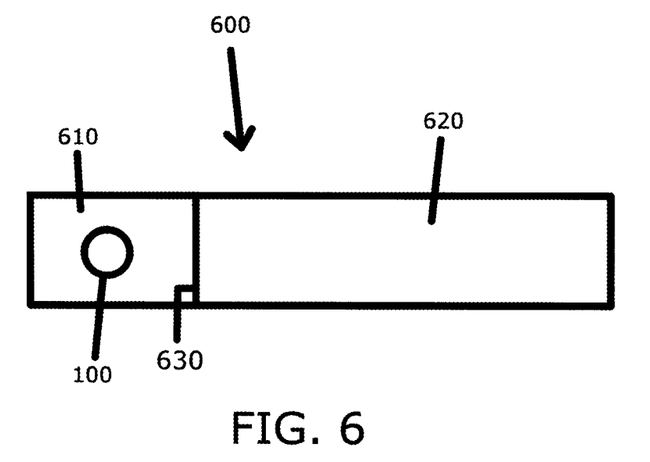
FIG. 6 illustrates a smoking article according to an embodiment as disclosed herein.

FIG. 6 illustrates a smoking article 600 according to an embodiment as disclosed herein. The smoking article 600 includes a filter element 610 and a tobacco rod 620. In an embodiment, the filter element 610 can be joined to the tobacco rod 620 with tipping paper 630. In an embodiment, the filter element 610 can include cellulose acetate and optionally a derivative thereof. In an embodiment, the filter element 610 can include a filter overwrap.

The filter element 610 preferably includes at least one seamless breakable capsule 100 therein. In an embodiment, the at least one seamless breakable capsule 100 can be embedded in the filter material or located in a void space of the filter element 610. Alternatively, the at least one seamless breakable capsule 100 can be disposed in a hollow cavity between two conventional cigarette filters such as plugs of cellulose acetate.

Before and/or during smoking, an adult individual may use finger pressure to break the at least one seamless breakable capsule 100 so as to release the composition of the inner core 120 of the at least one seamless breakable capsule 100. The composition of the inner core 120 can include flavorants and/or non-flavorants wherein during smoking the flavorants and/or non-flavorants can be released from the seamless breakable capsule 100 and combine with mainstream smoke during a puff on the smoking article. In an embodiment, the flavorants and/or non-flavorants can modify the composition of the mainstream smoke to enact a desired effect.

In this specification, the word "about" is often used in connection with numerical values to indicate that mathematical precision of such values is not intended. Accordingly, it is intended that where "about" is used with a numerical value, a tolerance of plus or minus 10% is contemplated for that numerical value. The term "substantially", when referring to a number or value, means plus or minus 10% of the value; when referring to a sphere, it means a distorted sphere whose larger diameter is plus or minus 10% of the diameter of the expected sphere.

While the foregoing describes in detail a seamless breakable capsule and method for forming a seamless breakable capsule with reference to specific embodiments thereof, it will be apparent to one skilled in the art that various changes and modifications and equivalents to embodiments and methods as disclosed herein may be employed, which do not materially depart from the spirit and scope of the embodiments disclosed herein.

What is claimed is:

1. A breakable capsule comprising:
   a outer shell that defines an inner core, the outer shell including, a cross-linked agar matrix, the cross-linked agar matrix including, a carboxymethyl cellulose (CMC), and
   a filler dispersed throughout the cross-linked agar matrix, the filler including,
      a first mixture including 0.05 wt. % to 0.5 wt. % locust bean gum, 3 wt. % to 5 wt. % pullulan, 0.1 wt. % to 1 wt. % glycerin, sorbitol, or both glycerin and sorbitol, and 0.1 wt. % to 1 wt. % sodium chloride,
      a second mixture including 0.05 wt. % to 0.5 wt. % locust bean gum, 3 wt. % to 5 wt. % hydroxypropyl methyl cellulose, maltodextrin, or both hydroxypropyl methyl cellulose and maltodextrin, and 0.1 wt. % to 1 wt. % glycerin, sorbitol, or both glycerin and sorbitol, or
      a third mixture including 0.05 wt. % to 0.5 wt. % locust bean gum, 4 wt. % to 4.5 wt. % pullulan, 1 wt. % glycerin, and 1 wt. % sodium chloride; and
   a flavor-enhancing agent, a non-flavorant agent, or both a flavor-enhancing agent and a non-flavorant agent in the inner core.

2. The breakable capsule of claim 1, wherein the cross-linked agar matrix has a first porosity and the carboxymethyl cellulose (CMC) fills voids in the cross-link agar matrix such that the outer shell has a second porosity that is less than the first porosity.

3. The breakable capsule of claim 2, wherein the second porosity is less than 10% of the first porosity.

4. The breakable capsule of claim 2, wherein the second porosity is about 1% of the first porosity.

5. The breakable capsule of claim 1, further comprising:
   a coating on an exposed surface of the outer shell.

6. The breakable capsule of claim 5, wherein the coating includes ethyl cellulose.

7. The breakable capsule of claim 1, wherein the cross-linked agar matrix further includes an additional carbohydrate.

8. The breakable capsule of claim 7, where the additional carbohydrate includes alginate, pectin, or both alginate and pectin.

9. The breakable capsule of claim 1, wherein the outer shell further comprises:
   glycerin, sorbitol, sodium chloride, guar gum, gum arabic, inulin, or any combination thereof.

10. The breakable capsule of claim 1, wherein the outer shell has a crush strength between 3 Newtons and 10 Newtons.

11. The breakable capsule of claim 1, wherein the outer shell has an outer diameter between 2 mm and 4.5 mm.

12. The breakable capsule of claim 1, wherein the outer shell has a water content less than 0.1 wt. %.

13. The breakable capsule of claim 1, wherein the outer shell has a water content less than 1 wt. %.

14. The breakable capsule of claim 1, wherein the flavor-enhancing agent includes licorice, wintergreen, cherry type flavorants, berry type flavorants, Dramboui, bourbon, scotch, whiskey, spearmint, peppermint, lavender, cinnamon, cardamon, *apium* graveolents, clove, cascarilla, nutmeg, sandalwood, bergamot, geranium, honey essence, rose oil, vanilla, lemon oil, orange oil, Japanese mint, cassia, caraway, cognac, jasmine, chamomile, menthol, ilangilang, sage, fennel, piment, ginger, anise, coriander, coffee, salts, sweeteners, carbohydrates, mint oils, eugenol, cocoa, citrus, other fruit flavors, or any combination thereof.

15. The breakable capsule of claim 1, wherein the non-flavorant agent includes sensates, the sensates including cooling agents, diluents, aerosol formers, or any combination thereof.

16. The breakable capsule of claim 1, wherein inner core further comprises:
a medium-chain triglyceride (MCT) oil.

17. The breakable capsule of claim 1, wherein the filler further comprises:
konjac, xanthan gum, or both konjac and xanthan gum.

18. The breakable capsule of claim 1, wherein the flavor-enhancing agent, the non-flavorant agent, or both the flavor-enhancing agent and the non-flavorant agent is provided as a liquid mixture.

19. The breakable capsule of claim 1, wherein the flavor-enhancing agent, the non-flavorant agent, or both the flavor-enhancing agent and the non-flavorant agent is provided as a gel.

20. The breakable capsule of claim 1, wherein the outer shell is formed from a shell forming solution including 1 wt. % to 2 wt. % agar and 0.05 wt. % to 0.5 wt. % carboxymethyl cellulose (CMC).

* * * * *